United States Patent [19]
Mallow et al.

[11] Patent Number: 5,569,153
[45] Date of Patent: Oct. 29, 1996

[54] METHOD OF IMMOBILIZING TOXIC WASTE MATERIALS AND RESULTANT PRODUCTS

[75] Inventors: William A. Mallow, Helotes; Robert D. Young, San Antonio, both of Tex.

[73] Assignee: Southwest Research Institute, San Antonio, Tex.

[21] Appl. No.: 396,968

[22] Filed: Mar. 1, 1995

[51] Int. Cl.⁶ .................................. A62D 3/00; G21F 9/34
[52] U.S. Cl. .................. 588/256; 106/697; 106/707; 106/708; 106/709; 210/751; 588/4; 588/201; 588/252; 588/257; 548/901
[58] Field of Search .................................. 588/3, 4, 201, 588/252, 256, 257, 901; 106/697, 705, 706, 707, 708, 709, 710, DIG. 1; 210/751; 501/155

[56] References Cited

U.S. PATENT DOCUMENTS

| | | |
|---|---|---|
| Re. 31,575 | 5/1984 | Ludwig et al. .................... 106/257.32 |
| 3,152,984 | 10/1964 | Winsche et al. . |
| 3,988,258 | 10/1976 | Curtiss et al. . |
| 4,011,179 | 3/1977 | Woo et al. . |
| 4,022,857 | 5/1977 | Dale et al. . |
| 4,116,705 | 9/1978 | Chappell .............................. 588/256 X |
| 4,290,816 | 9/1981 | Ludwig et al. .................... 106/287.32 |
| 4,407,742 | 10/1983 | Hrovat et al. . |
| 4,428,700 | 1/1984 | Lennemann ............................ 405/128 |
| 4,475,953 | 10/1984 | Ludwig et al. .................... 106/287.24 |
| 4,505,851 | 3/1985 | Funabashi et al. . |
| 4,518,508 | 5/1985 | Conner ..................................... 210/751 |
| 4,600,610 | 7/1986 | Hrovat et al. . |
| 4,615,809 | 10/1986 | King ......................................... 210/751 |
| 5,049,285 | 9/1991 | Somerville et al. ................ 210/751 X |
| 5,196,620 | 3/1993 | Gustin et al. ........................... 588/257 |
| 5,238,583 | 8/1993 | Fortson ................................... 210/751 |
| 5,259,697 | 11/1993 | Allen et al. .......................... 106/697 x |
| 5,269,975 | 12/1993 | Noakes ................................ 588/252 X |
| 5,434,333 | 7/1995 | Jantzen et al. ...................... 588/252 X |
| 5,482,528 | 1/1996 | Angell et al. ....................... 106/708 X |

OTHER PUBLICATIONS

Smith, Dwight K., *Cementing*, 1987, pp. 14, 15.

*Primary Examiner*—George A. Suchfield
*Attorney, Agent, or Firm*—John L. Sigalos

[57] ABSTRACT

A method of immobilizing toxic waste material slurries is disclosed wherein aggregates are formed containing the toxic waste and the aggregates admixed with and embedded in a sulfur cement to form a concrete shape. Novel aggregates and mortar, and concrete products containing such aggregates embedded in a sulfur cement are also disclosed,

18 Claims, No Drawings

5,569,153

METHOD OF IMMOBILIZING TOXIC WASTE MATERIALS AND RESULTANT PRODUCTS

BACKGROUND OF THE INVENTION

The present invention relates to a method of immobilizing toxic waste materials, particularly low level radioactive waste, and generating resultant useful products.

At the present time, a great deal of effort is being expended for finding economic and effective methods of disposing of hazardous waste, particularly radioactive waste, in such a manner that it does not leach into the soil or water supply. Large amounts of such low-level and high-level waste or low-level and high-level radioactive hazardous waste has been generated by both military and peaceful uses, such as electrical power generation and medical uses such as tracers. Initially, these materials were disposed of in landfills, but as long term hazards from such disposal were identified, such disposal methods were no longer permitted. Further complicating the problem, such waste became regulated without any proper approved disposal method. Consequently, much of this waste generated and still being generated is placed in storage for future disposal and known contaminated areas isolated for future cleanup. Congress enacted the Resource Conservation and Recovery Act (RCRA) mandating cleanup and disposal of these materials. The majority of such waste is "owned" by the Department of Energy and nuclear power plants and they are trying to develop approved disposal methods.

The leading method (Best Avalable Technique "BAT") at the present time is vitrification, which attempts to incorporate the radioactive wastes into sand and molten glass, with an aim to immobilizing the hazardous components upon solidification. This, despite years of effort, has not proven to be successful, particularly because of the associated problems of volatilization of hazardous components during encapsulation, accelerated leaching of hazardous components at the crack tips which form as the glassy mixture cools, and the expense associated with this method.

In addition to health and safety threats, it is estimated that it will cost an estimated $300 billion over 30 years just to clean up the radioactive and hazardous waste at the former nuclear weapons plants around the country.

There, thus, still exists a need to inexpensively immobilize such hazardous waste so that it can be disposed of without presenting any pollution problem, and which particularly adheres to the EPA leachability requirements and the Clean Water Act, so as to render the hazardous material innocuous.

SUMMARY OF THE INVENTION

The present invention provides an economic and effective method for immobilizing hazardous, toxic waste materials, such as lower level radioactive hazardous waste, so that it will not only be in a form in which none of the hazardous materials can be leached therefrom, but which also can be formed into useful products.

Briefly, the present invention comprises a method of immobilizing toxic waste materials comprising forming a crude aggregate of such hazardous waste material with certain cementitious materials and admixing such aggregate with a molten, modified sulfur cement. The present invention also comprises immobilized toxic waste aggregates and shaped materials produced by such method.

DETAILED DESCRIPTION

As used herein the term "toxic waste material" includes any hazardous waste, including radioactive or mixed waste which presents a hazard if placed into landfills due to the possible contamination of water supplies or long term potential danger due to unforeseen complex chemical interactions with other unknown substances buried in close proximity thereto.

The present invention will be described in connection with waste generated, for example, by atomic power plants generating electricity, it being understood that the process is applicable to other hazardous wastes.

The initial step of the instant process is to accomplish the chemical or mechanical bonding to create a strong ceramic material by forming a cured aggregate.

Such aggregate is formed by admixing the waste which is usually in the form of a slurry containing as high as 50% solids with a pozzolana; a calcium hydroxide-containing material such as a lime (quick lime, hydrated lime), kiln dust, or mixtures thereof; a hydrothermal cement reactant, such as zinc or aluminum oxide, with anhydrous sodium silicate powder; and a hydraulic cement, preferably a Portland cement, calcium aluminate cement, or plaster of paris. If there is inadequate liquid to form the mixture into a moldable consistency, sufficient water is added for that purpose. The mixture is formed into any shape and permitted to cure at room temperature until set and then heated at a temperature sufficient to completely cure the same as with other pozzolanic cements, normally at a temperature of about 350° F. for about four to eight hours.

The pozzolanas are usually defined as materials which will combine with lime at ordinary temperature, in the presence of water, to form stable insoluble compounds possessing cementing properties. Such stable insoluble compounds are referred to herein as "pozzolanic cements". Pozzolanas can be naturally occurring materials such as volcanic ashes and tuffs, clays, and the like, and synthetic materials such as fly ash, particularly Class F fly ash, rice hull ash, bagasse and the like. It is preferred to utilize Class F fly ash in the instant invention.

With respect to solid hazardous wastes, such as soils contaminated with toxic waste material, they can either be first admixed with a liquid and used as the waste slurry discussed above, or sufficient water added to give the final mixture containing the contaminated soil a moldable consistency and then treated as described above.

The resultant cured material is then formed into an aggregate by any typical grinding technique and usually to a size suitable for use in forming concretes; namely particle sizes of about ¼ to ½ inch.

Separately, a modified sulfur cement is formed by reacting sulfur as is known with about 10% by weight of a hydrocarbon, preferably vinyl toluene, dicyclopentadiene, or mixtures thereof, to form a sulfur reaction product which is more amorphous in nature as opposed to being crystalline. The method of making such modified sulfur reaction products is old and shown, for example, in U.S. Pat. No. 4,290,816 and the reissue thereof, U.S. Pat. No. RE 31,575.

The cured aggregate and the modified sulfur cement reaction product which has been placed into molten form, are admixed and preferably there is added thereto, for increased strength, additional pozzolana and also most suitably any conventional strong calcitic or siliceous aggregate, such as pea gravel, and sand. It is preferred to add the additional pozzolanic material, and sand, in order to give the products that result from the mortar formed a high strength, preferably a compressive strength at least 10,000 psi. The calcitic or siliceous aggregate is added to form concrete products.

It will be evident that as the mass of molten cement, cured aggregate and other components is admixed and allowed to cure, that the product that results can be formed into any shape desired. It is one of the aspects of the instant invention that the product can be formed into useful structural shapes, such as cinder block, brick, slabs, and the like known building material shapes made from conventional cements, mortar, and concretes and used to form structures to house other waste material above the ground. As described below, this is safely accomplished because of the fact that the instant products immobilize the waste material so that the hazardous components thereof do not leach out of the shape formed. Moreover, having them above ground enables constant inspection thereof and possible recoating again with additional sulfur cement reaction products if, after many years it is noted that such further coating is needed to ensure immobilization of the materials.

An alternative step in the method is not to add the hydraulic cement, such as Portland cement, until the slurry has been thoroughly wetted and blended with all the components, save for the hydraulic cement. It has been found that this results in much higher compressive strengths. While the reasons for this are not completely understood, it is believed that metals and other materials in hazardous wastes act to "poison" Portland cement and other hydraulic cements and prevent their proper hardening. By delaying the addition of the hydraulic cements, the pozzolanas and other components act to ameliorate this adverse activity of the metals and other components of the waste, thereby permitting the hydraulic cement to properly harden.

As is also described below, the products produced by the instant chemical and mechanical bonding process are subjected to the EPA test for total concentration leachability percent contaminants. This is identified by the EPA Eptox Methodology set forth in SW846, Method 1311.

As to proportions, it is preferred in forming the aggregate to utilize the following parts by weight of components with the low-level waste (LLW) or low-level hazardous radioactive waste (LLHRW) slurry calculated at 50% by weight solid.

|  | Parts by Weight |
| --- | --- |
| LLHRW or LLW | 20–40 |
| Lime | 5–10 |
| Class F Fly Ash | 50–100 |
| Hydrothermal Cement Reactant (ZnO or Al$_2$O$_3$) | 2–5 |
| Anhydrous Sodium Silicate | 10–30 |
| Hydraulic Cement | 10–20 |
| Water | As needed |

In addition to the material noted as most suitable to form the aggregates, it is preferred also to add sand for grogging purposes, ordinarily from about 40 to 60 parts by weight. It is also preferred that the anhydrous sodium silicate have a silica to sodium ratio of 2.0 to 3.22:1.

With respect to forming the final product, equal parts by weight of the cured aggregate and the modified sulfur cement reaction product are used, and it is preferred to add also the pozzolana, the calcitic or siliceous aggregate (if used), and sand. The range of operated and preferred proportions is as set forth below.

|  | Parts by Weight | |
| --- | --- | --- |
|  | Operable | Preferred |
| Aggregate | 0.35–1 | 0.5 |
| Modified Sulfur Cement | 0.1–1.5 | 0.2 |
| Fly Ash | 0–1.5 | 0.1 |
| Pea Gravel | 0–1.5 | 0.1 |
| Sand | 0–1.5 | 0.1 |

As previously noted, for greatest compressive strength, it is preferred to include the additional pozzolanic material, and sand.

The invention will be further described in connection with the following examples which are set forth for purposes of illustration only, and in which proportions are in parts by weight unless expressly stated to the contrary.

The low-level waste slurry utilized in these examples is a stimulant used by the Hanford DOE facility. The particulars thereof are set forth in the Kincaid et al article (1993) "PERFORMANCE ASSESSMENT OF GROUTED DOUBLE SHELL TANK WASTE DISPOSAL AT HANFORD WAC-5D-WM-EE-004, REV. O.", Westinghouse Hanford Company, Richland, Wash.

EXAMPLE 1

The following materials were mixed together.

|  | Parts by Weight |
| --- | --- |
| Lime | 5 |
| Class F Fly Ash | 50 |
| Zinc Oxide | 2 |
| Anhydrous Sodium Silicate (SiO$_2$ to Na$_2$O ratio of 2:1) | 30 |
| Sand | 50 |
| Portland Cement | 15 |
| Low-Level Waste Slurry (52% solids) | 20 |
| Water | 20 |

The composition was formed into a moldable mass which was shaped into 2 inch×2 inch cubes and permitted to cure at room temperature followed by curing at 350° F. for approximately four hours. Some of the cubes were then tested using ASTM C-109 and it was observed that a compressive strength of about 11,000 psi was obtained. Some cubes were ground into aggregate (¼ to ½ inch). Equal parts by weight of a modified sulfur reaction product placed in molten form was admixed with this aggregate. The modified sulfur reaction powder was formed with about 10% vinyl toluene. In addition to equal parts by weight of the modified sulfur reaction product and the cured aggregate, there were added also equal parts by weight of a Class C fly ash and pea gravel having ¼ inch diameter size. The mixture was thoroughly admixed, shaped into concrete cylinders 3 inches in diameter and 6 inches long, cured, and tested for compressive strength. They had a compressive strength of about 10,000 psi.

In order to test for leachability, the aggregate blocks previously described, as well as the cylinders of concrete, were then subjected to the EPA leaching test for TCLP by methodology SW846 Method 1311. This comprises grinding the solids such that they pass through a 200 mesh screen (Tyler) and leaching in a 5% acetic acid solution for 24 hours as required in the noted EPA procedures SW846 Method 1311. Analysis of the solution for TCLP contaminants found that all heavy metal concentrations were significantly below the EPA criteria for hazardous leachate, including transuranic elements.

EXAMPLES 2 AND 3

The method of Example 1 was followed except that the formulation of the composition used to form the cement was as follows:

|  | Parts by Weight |
|---|---|
| Lime | 5 |
| Class F Fly Ash | 50 |
| Zinc Oxide | 2 |
| Anhydrous Sodium Silicate (SiO$_2$ to Na$_2$O ratio of 3.22:1) | 15 |
| Sand | 50 |
| Portland Cement (Type I) | 20 |
| Low-Level Waste Slurry (52% solids) | 20 |
| Water | 20 |

The aggregate formed as in Example 1 was formed into two different concrete cylinders, using three different concrete formulations, A, B, and C. These were as follows:

|  | A | B | C |
|---|---|---|---|
| Aggregate | 100 | 100 | 100 |
| Fly Ash | 20 | 20 | 20 |
| Sand | 75 | 75 | 20 |
| Sulfur Cement I | 30 | — | — |
| Sulfur Cement II | — | 30 | 40 |

The sulfur cements differed only in the amount of hydrocarbon used to react with the sulfur, with Sulfur Cement I being the cement resulting from the reaction of 2.5 parts by weight of each of vinyl toluene and dicyclopentadiene with 100 parts by weight of sulfur and Sulfur Cement II, using only 1.5 by weight of each of the hydrocarbons for 100 parts by weight of the sulfur.

When the compressive strengths of the test cylinders was measured, those made with Sulfur Cement I had compressive strengths of 7,500 to 8,500 psi and those made with Sulfur Cement II a compressive strength of 9,000 to 11,000 psi.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of immobilizing toxic waste material slurries comprising:
   (a) forming a cured aggregate by:
      (i) admixing a pozzolana, a calcium hydroxide-containing material, hydrothermal cement reactant, hydraulic cement, and said toxic waste material slurry with additional liquid, if required, to form a mixture of moldable consistency;
      (ii) molding the mixture into a shape;
      (iii) curing the shape; and
      (iv) forming the cured shape into aggregates;
   (b) admixing the aggregate with a molten sulfur cement, a pozzolana, and sand to form a mortar having the cured aggregate imbedded in the sulfur cement; and
   (c) hardening the mixture into a solid mass.

2. The method of claim 1 in which a strong calcitic or siliceous aggregate is admixed with the cured aggregate, sulfur cement, pozzolana, and sand to form a concrete.

3. The method of claim 1 wherein the hydraulic cement is added to the admixture after the other components have first been thoroughly wetted and blended.

4. The method of claim 2 wherein the hydraulic cement is added to the admixture after the other components have first been thoroughly wetted and blended.

5. The method of claim 1 wherein said pozzolana is Class F fly ash, said calcium hydroxide-containing material is a lime; said hydrothermal cement reactant is zinc oxide, aluminum oxide, or a mixture thereof with anhydrous sodium silicate; said hydraulic cement is a Portland cement, calcium aluminate cement, plaster of paris, or a mixture thereof; and said sulfur cement is the reaction product of sulfur and a hydrocarbon.

6. The method of claim 2 wherein said pozzolana is a Class F fly ash, said calcium hydroxide-containing material is a lime; said hydrothermal cement reactant is zinc oxide, aluminum oxide, or a mixture thereof with anhydrous sodium silicate; said hydraulic cement is a Portland cement, calcium aluminate cement, plaster of paris, or a mixture thereof; and said sulfur cement is the reaction product of sulfur and a hydrocarbon.

7. The method of claim 5 wherein the proportions of components used to form the moldable mixture is:

|  | Parts by Weight |
|---|---|
| Toxic Waste Material | 20–40 |
| Pozzolanic Cement | 55–110 |
| Hydrothermal Cement Reactant | 2–5 |
| Anhydrous Sodium Silicate | 10–30 |
| Hydraulic Cement | 10–20 |
| Water | 30–40. |

8. The method of claim 6 wherein the proportions of components used to form the moldable mixture is:

|  | Parts by Weight |
|---|---|
| Toxic Waste Material | 20–40 |
| Pozzolanic Cement | 55–110 |
| Hydrothermal Cement Reactant | 2–5 |
| Anhydrous Sodium Silicate | 10–30 |
| Hydraulic Cement | 10–20 |
| Water | 30–40. |

9. An immobilized toxic waste-containing material product comprising shaped, cured aggregates comprising a pozzolanic cement, hydrothermal cement reactant hydraulic cement and toxic waste material imbedded in a sulfur cement.

10. The product of claim 9, wherein said pozzolana is Class F fly ash, said calcium hydroxide-containing material is a lime; said hydrothermal cement reactant is zinc oxide, aluminum oxide, or a mixture thereof with anhydrous sodium silicate; said hydraulic cement is a Portland cement, calcium aluminate cement, plaster of paris, or a mixture thereof; and said sulfur cement is the reaction product of sulfur and a hydrocarbon.

11. The product of claim 10, wherein the proportions are as follows:

|  | Parts by Weight |
|---|---|
| Cured Aggregate | 0.35–1 |
| Modified Sulfur Cement | 0.1–1.5. |

12. The product of claim 10 in the form of a slab, cinder block, or brick.

13. The product of claim 11 in the form of a slab, cinder block, or brick.

14. The product of claim 9 including a pozzolana and sand admixed with the cured aggregates and sulfur cement.

15. The product of claim 14 in which a strong calcitic or siliceous aggregate is also admixed with the cured aggregates and sulfur cement.

16. An immobilized toxic waste material aggregate comprising a cured composition comprising a pozzolanic cement, hydrothermal cement reactant, hydraulic cement, and toxic waste material.

17. The aggregate of claim 16, wherein the proportions are as follows:

|  | Parts by Weight |
|---|---|
| Toxic Waste Material | 20–40 |
| Pozzolanic Cement | 55–110 |
| Hydrothermal Cement Reactant | 2–5 |
| Anhydrous Sodium Silicate | 10–30 |
| Hydraulic Cement | 10–20 |
| Water | 15–30. |

18. The aggregate of claim 17, wherein the aggregate particles range in size from about ¼ to ½ inch in diameter.

\* \* \* \* \*